(12) United States Patent
Decelles et al.

(10) Patent No.: US 12,330,398 B2
(45) Date of Patent: Jun. 17, 2025

(54) FLAME RETARDANT MULTILAYER MATERIAL, METHOD OF MANUFACTURE, AND USES THEREOF

(71) Applicant: ROGERS CORPORATION, Chandler, AZ (US)

(72) Inventors: Loni Decelles, Brooklyn, CT (US); Joseph Puglisi, Brooklyn, CT (US)

(73) Assignee: ROGERS CORPORATION, Chandler, AZ (US)

(*) Notice: Subject to any disclaimer, the term of this patent is extended or adjusted under 35 U.S.C. 154(b) by 231 days.

(21) Appl. No.: 17/970,733

(22) Filed: Oct. 21, 2022

(65) Prior Publication Data
US 2023/0127270 A1 Apr. 27, 2023

Related U.S. Application Data

(60) Provisional application No. 63/272,292, filed on Oct. 27, 2021.

(51) Int. Cl.
*B32B 27/06* (2006.01)
*B32B 5/18* (2006.01)
(Continued)

(52) U.S. Cl.
CPC ............. *B32B 27/065* (2013.01); *B32B 5/18* (2013.01); *B32B 27/36* (2013.01); *B32B 27/20* (2013.01);
(Continued)

(58) Field of Classification Search
CPC ......... B32B 27/065; B32B 5/18; B32B 27/36; B32B 27/40; B32B 27/20; B32B 2264/10;
(Continued)

(56) References Cited

U.S. PATENT DOCUMENTS

| 7,125,460 B2 | 10/2006 | Ogle et al. |
| 8,592,067 B2 | 11/2013 | Yokoyama et al. |

(Continued)

FOREIGN PATENT DOCUMENTS

| CN | 102239205 A | 11/2011 |
| CN | 105008122 A | 10/2015 |

(Continued)

OTHER PUBLICATIONS

Decelles et al., U.S. Appl. No. 17/970,727, filed Oct. 21, 2022 entitled Flame Retardant Multilayer Material, Method of Manufacture, and Uses Thereof (32 pages).
(Continued)

*Primary Examiner* — Joanna Pleszczynska
(74) *Attorney, Agent, or Firm* — CANTOR COLBURN LLP (57) ABSTRACT

A multilayer material, including a compressible polymer foam layer, wherein the compressible polymer foam layer has a density of less than 400 kg/m³, a compression force deflection of 5 to 1,035 kPa at 25% deflection determined in accordance with ASTM D3574-17, and a thickness of less than 3.5 millimeters; and a solid, polymeric flame retardant layer disposed on a first side of the compressible polymer foam layer, wherein the flame retardant layer has a thickness of less than 0.3 millimeters, wherein the thickness of the compressible polymer foam layer is at least two times greater than the thickness of the flame retardant layer; wherein each of the compressible polymer foam layer and the flame retardant layer includes a flame retardant composition, and wherein the multilayer material has a thickness of 3.5 millimeters or less, and a UL-94 rating of V1, preferably V0, HF1, or a combination thereof.

18 Claims, 1 Drawing Sheet

(51) Int. Cl.
  *B32B 27/20* (2006.01)
  *B32B 27/36* (2006.01)
  *B32B 27/40* (2006.01)
(52) U.S. Cl.
  CPC ..... *B32B 2264/10* (2013.01); *B32B 2264/203* (2020.08); *B32B 2264/303* (2020.08); *B32B 2266/0221* (2013.01); *B32B 2266/0228* (2013.01); *B32B 2266/0235* (2013.01); *B32B 2266/0242* (2013.01); *B32B 2266/025* (2013.01); *B32B 2266/0257* (2013.01); *B32B 2266/0264* (2013.01); *B32B 2266/0271* (2013.01); *B32B 2266/0278* (2013.01); *B32B 2266/0285* (2013.01); *B32B 2307/3065* (2013.01); *B32B 2307/72* (2013.01); *B32B 2307/732* (2013.01)
(58) Field of Classification Search
  CPC .......... B32B 2307/72; B32B 2307/732; B32B 2266/0278; B32B 2266/0264
  See application file for complete search history.

(56) References Cited

U.S. PATENT DOCUMENTS

| | | | |
|---|---|---|---|
| 8,592,076 | B2 | 11/2013 | Sugita et al. |
| 8,936,851 | B2 | 1/2015 | Sheng |
| 9,540,763 | B2 | 1/2017 | Grunlan |
| 9,752,009 | B2 * | 9/2017 | Stockdale ............... C08L 77/02 |
| 2006/0079612 | A1 | 4/2006 | Troutman et al. |
| 2011/0192564 | A1 | 8/2011 | Mommer et al. |
| 2012/0009401 | A1 | 1/2012 | McCoy et al. |
| 2014/0147658 | A1 | 5/2014 | Hosoma et al. |
| 2017/0127748 | A1 | 5/2017 | Sethumadhavan et al. |
| 2018/0111349 | A1 | 4/2018 | Polidore et al. |
| 2019/0281726 | A1 | 9/2019 | Puglisi |
| 2020/0161727 | A1 | 5/2020 | Phlegm et al. |
| 2020/0388810 | A1 | 12/2020 | Wang et al. |
| 2021/0013460 | A1 * | 1/2021 | Ootsuki ................ B32B 27/285 |
| 2021/0257690 | A1 | 8/2021 | Kilhenny et al. |
| 2021/0316537 | A1 | 10/2021 | Adam, Jr. et al. |
| 2023/0113745 | A1 | 4/2023 | Adam, Jr. et al. |
| 2023/0131443 | A1 | 4/2023 | Decelles et al. |

FOREIGN PATENT DOCUMENTS

| | | |
|---|---|---|
| JP | 2013144397 A | 7/2013 |
| JP | 2015024028 A | 2/2015 |
| KR | 20070030695 | 3/2007 |
| KR | 20180120383 A | 11/2018 |
| WO | 2011084804 A2 | 7/2011 |
| WO | 2022155056 A1 | 7/2022 |
| WO | 2023037271 A1 | 3/2023 |

OTHER PUBLICATIONS

International Search Report (ISA/EPO) mailed Feb. 10, 2023 in International Application No. PCT/US2022/047351 filed Oct. 21, 2022, 5 pages.
Written Opinion of the International Searching Authority (ISA/EPO) mailed Feb. 10, 2023 in International Application No. PCT/US2022/047651 filed Oct. 21, 2022, 5 pages.

* cited by examiner

FLAME RETARDANT MULTILAYER MATERIAL, METHOD OF MANUFACTURE, AND USES THEREOF

CROSS-REFERENCE TO RELATED APPLICATION

This application claims priority to and the benefit of U.S. Provisional Application No. 63/272,292 filed on Oct. 27, 2021, the entire content of which is incorporated herein by reference.

BACKGROUND

This application relates to a flame retardant multilayer material, in particular a flame retardant multilayer material including a compressible polymer foam, a method of preparing the flame retardant multilayer material, and uses thereof.

Polymer foams have a wide variety of uses in the art. Compressible (as opposed to rigid) foams are particularly useful for cushioning and impact protection, particularly in electronic devices. As the demand for smaller, thinner, and more compact devices has increased, so has the demand for thinner, less dense polymer foams, for example foams having a density of 200 kilograms per cubic meter ($kg/m^3$) and a thickness of less than 3.5 millimeters (mm), less than 3 mm, or even less than 2 mm. However, it has been difficult to produce foams of this thickness that still meet the stringent requirements for good cushioning properties, such as good compression set, and good flame retardance. These properties are important in hand-held electronic devices, as well as electronic devices such as televisions, radios, computers, medical instruments, business machines, communications equipment, and the like. The increasing power of such devices has made obtaining flame retardance even more challenging, due to increased heat being generated within ever smaller spaces.

Accordingly, there remains a need in the art for lightweight materials that are thin, that provide good cushioning to minimize shock or vibration, and that can provide good flame retardance, for example a UL-94 rating of V0, HF1, or a combination thereof at a thickness of 3.0 mm or less.

BRIEF SUMMARY

Disclosed herein is a multilayer material, including a compressible polymer foam layer, wherein the compressible polymer foam layer has a density of less than 400 $kg/m^3$ (25 pounds per cubic foot ($lb/ft^3$ or PCF), a compression force deflection of 5 to 1,035 kilopascals (kPa) at 25% deflection determined in accordance with ASTM D3574-17, and a thickness of less than 3.5 millimeters (130 mils); and a solid, polymeric flame retardant layer disposed on a first side of the compressible polymer foam layer, wherein the flame retardant layer has a thickness of less than 0.3 millimeters (11.8 mil), wherein the thickness of the compressible polymer foam layer is at least two times greater than the thickness of the flame retardant layer; wherein each of the compressible polymer foam layer and the flame retardant layer includes a flame retardant composition, and wherein the multilayer material has a thickness of 3.5 millimeters (130 mils) or less, and a UL-94 rating of V1, preferably V0, HF1, or a combination thereof.

Methods of preparing the multilayer material are also disclosed, as are electronic devices including the multilayer material.

The above described and other features are exemplified by the following figures, detailed description, and claims.

BRIEF DESCRIPTION OF THE DRAWINGS

The following figures are exemplary aspects, which are provided to illustrate this disclosure. The figures that are illustrative of the examples are not intended to limit products made in accordance with the disclosure to the materials, conditions, or process parameters set forth herein.

DETAILED DESCRIPTION

The present inventors have discovered that very thin, flame retardant multilayer materials with good cushioning properties and flame retardance can be produced using a compressible polymer foam layer and a thinner, solid, polymeric flame retardant layer. The flame retardance achieved for the combination allows the production of very thin compressible materials with low overall density, good compression properties, and excellent flame retardance.

While flame retardant materials with decreased thicknesses are desired, flame retardance of a compressible polymer foam layer decreases with decreased thickness. For example, a compressible polymer foam layer having a density of 12 $lb/ft^3$ (192 $kg/m^3$) and a thickness of 3 millimeters (mm) or less may not provide a desirable level of flame retardance. The present inventors surprisingly discovered that by combining a compressible polymer foam layer having a thickness that does not provide a desirable level of flame retardance with a thinner, solid, polymeric flame retardant layer, improved flame retardance can be achieved while maintaining other desirable properties of the compressible polymer foam layer such as compression force deflection, compression set, or a combination thereof. In an aspect, the compressible polymer foam layer is at least twice as thick, for example, at least three times as thick, at least five times as thick, or at least fifty times as thick, or more, as the thinner, solid, polymeric flame retardant layer (which can be referred to herein as the flame retardant layer for convenience).

The thinner, flame retardant layer contacts the compressive foam layer to increase flame retardance. The multilayer material has desirable structural features such as constant compressive force and shock and vibration protection, in addition to the improved flame retardance. In an aspect, the multilayer material can achieve a UL-94 rating of V1, or even V0, HF1, or a combination thereof. The flame retardant multilayer material can be used in a variety of applications and is particularly suitable for use as a low density, flame retardant compressible layer in an electronic device.

Figure 1:
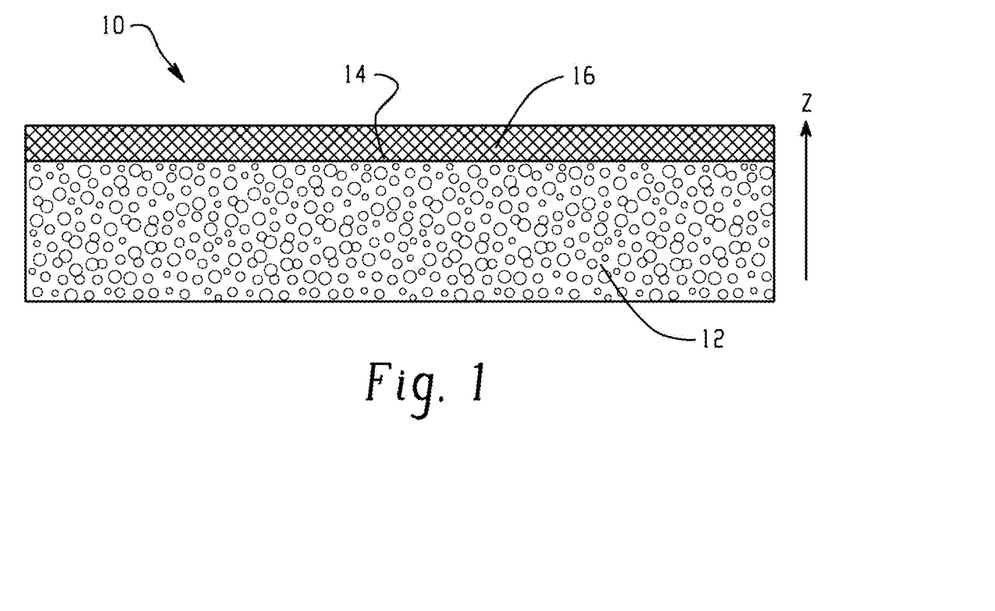
FIG. 1 is a cross-sectional schematic illustration of an aspect of a flame retardant multilayer material.

An exemplary flame retardant multilayer material (which can be referred to herein as the "multilayer material" for convenience) is shown in FIG. 1, wherein the multilayer material 10 includes a compressible polymer foam layer 12 having a first surface 14. As used herein, "polymer foam" refers to any polymeric material having a porous or cellular structure. The pores can be open, closed, or a combination thereof. At least a portion of the pores can be open and extend through the compressible polymer foam layer. In an aspect, the lower compressible polymer foam layer comprises a combination of open and closed cells.

A flame retardant layer 16 is disposed on first surface 14 of compressible polymer foam layer 12. In a preferred aspect, the flame retardant layer 16 is disposed directly on the surface of the compressible polymer foam layer. Each layer 12, 16 can independently be continuous or discontinuous. For example, a via can be present that penetrates one layer or both layers. In an aspect, both the compressible polymer foam layer 12 and the flame retardant layer 16 are continuous. The edges of each of the layers 14, 16 can be coterminal, or an edge of the compressible polymer foam layer or the flame retardant layer can extend past the other layer.

To achieve the desired combination of cushioning and flame retardance properties, the compressible polymer foam layer can have a density of less than 481 kg/m$^3$ (30 lb/ft$^3$), for example, less than 400 kg/m$^3$ (25 lb/ft$^3$) or less than 320 kg/m$^3$ (20 lb/ft$^3$)), as described in further detail below. The density of the flame retardant layer is higher than that of the compressible polymer foam layer. In an aspect, the density of the flame retardant layer is significantly higher than the compressible polymer foam layer, for example at least two times, at least three times, or at least five times the density of the compressible polymer foam layer, also as described in further detail below.

The thickness of each of the compressible polymer foam layer and the flame retardant layer is adjusted to provide the desired properties and to minimize the total thickness of the multilayer material, where thickness is illustrated as the Z-direction in FIG. 1. As stated above, it is desired for the multilayer material to be thin, for example at 200 kg/m$^3$, 3.5 mm or less, or 3.0 mm or less. In an aspect, the multilayer material can have a thickness of 0.1 to 3.5 mm, or 0.1 to 3 mm, or 0.5 to 3.0 mm, or 0.5 to 2.5 mm. Without being bound by theory, it is believed that a combination of a thicker compressible polymer foam layer and a very thin flame retardant layer as compared to the compressible polymer foam layer allows the multilayer material to have the desired combination of cushioning and flame retardance. Accordingly, the compressible polymer foam layer can have a thickness of 1 to less than 3.5 mm, preferably 0.1 to 3 mm, 0.45 to 2.95 mm, or 0.45 to 2.45 mm. The flame retardant layer can have a thickness of 10 to 300 micrometers (μm) (0.01 to 0.3 mm), or 25 to 250 μm (0.025 to 0.25 mm).

Specific properties and compositions of each of the compressible polymer foam layer and the flame retardant layer are described next.

The compressible polymer foam layer provides the cushioning properties of the multilayer material. The compressible polymer foam layer can have an average cell size of 10 to 500, or 50 to 250 μm, as may be measured, for example, in accordance with ASTM D 3574-95. The cell size and distribution are preferably substantially uniform throughout the layer, to provide the desired compression properties. The compressible polymer foam layer can have a density of less than 400 kg/m$^3$ (25 lb/ft$^3$), for example, 320 kg/m$^3$ (20 lb/ft$^3$). For example, the compressible polymer foam layer can have a density of 80 to 400 kg/m$^3$ (5 to 25 lb/ft$^3$), or 128 to 320 kg/m$^3$ (8 to 20 lb/ft$^3$) or 160 to 288 kg/m$^3$ (10 to 18 lb/ft$^3$) or 192 to 288 kg/m$^3$ (12 to 18 lb/ft$^3$). The compressible polymer foam layer can have compression force deflection of 5 to 1,035 kPa, or 10 to 500 kPa, at 25% deflection determined in accordance with ASTM D3574-17. The compressible polymer foam layer can further have a compression force deflection of 100 to 500 kPa at 75% deflection determined in accordance with ASTM D3574-17. The compressible polymer foam layer can have a compression set of less than 15%. The compressible polymer foam layer can have a SAG factor (as defined by the compression force deflection at 65% divided by the compression force deflection at 25% of less than or equal to 3). In an aspect, the compressible polymer foam layer has a combination of at least two, preferably all, of the foregoing properties.

The compressible polymer foam layer comprises a polymer material that can be foamed to form a compressible material, and can be a thermoplastic, a thermoset, or a combination thereof. For example, compressible polymer foam layer can comprise a polyacetal, a poly($C_{1-6}$ alkyl) acrylate, a polyacrylic, a polyamide, a polyamideimide, a polyanhydride, a polyarylate, a polyarylene ether, a polyarylene sulfide, a polybenzoxazole, a polycarbonate, a polyester (such as an alkyd), a polyetheretherketone, a polyetherimide, a polyetherketoneketone, a polyetherketone, a polyethersulfone, a polyisocyanurate, a polyimide, a poly($C_{1-6}$ alkyl) methacrylate, a poly((meth)acrylic acid), a polyphthalide, a polyolefin (such as a fluorinated polyolefin), a polysilazane, a polystyrene, a polysulfide, a polysulfonamide, a polysulfonate, a polythioester, a polytriazine, a polyurea, a polyvinyl alcohol, a polyvinyl ester, a polyvinyl ether, a polyvinyl halide, a polyvinyl ketone, a polyvinylidene fluoride, a polyvinyl ester, a crosslinked poly (ester), an epoxy, a melamine, phenolic polymer, a polyurethane, a urea-formaldehyde, a silicone, a natural rubber, polychloroprene, an ethylene-propylene-di ene monomer (EPDM) rubber, or a combination thereof. The polymer can be a homopolymer, e.g., a polyethylene, or a copolymer, e.g., polyethylene-polypropylene. Preferred polymers are thermosets, in particular an epoxy, a polyurethane, or a combination thereof.

Polyurethanes that can be used include aliphatic, cycloaliphatic, aromatic, and polycyclic polyurethanes. Polyurethane foams are formed from reactive compositions comprising an organic polyisocyanate component, an active hydrogen-containing component reactive with the polyisocyanate component, a surfactant, and a catalyst. The process of forming the foam can use chemical or physical blowing agents, or the foam can be mechanically frothed. For example, one process of forming the foam comprises substantially and uniformly dispersing inert gas throughout a mixture of the reactive composition by mechanical beating of the mixture to form a heat curable froth that is substantially structurally and chemically stable, but workable at ambient conditions; and curing the froth to form a cured foam. In an aspect, a physical blowing agent is introduced into the froth to further reduce foam density during the crosslinking process. In another aspect, the polyurethane foam is formed from the reactive composition using only physical or chemical blowing agents, without the use of any mechanical frothing. Preferably the foam is formed by mechanical frothing, which allows higher control over foam thickness and improved cell structure.

Exemplary organic polyisocyanates include isocyanates having the general formula Q(NCO)$_i$ wherein i is an integer of two or more and Q is an organic radical having the valence of i, wherein i has an average value higher than 2. Q can be a substituted or unsubstituted hydrocarbon group that may or may not contain aromatic functionality, or a group having the formula Q$^1$-Z-Q$^1$ wherein Q$^1$ is a C$_{1-36}$ alkylene or C$_{6-36}$ arylene group and Z is —O—, —O-Q$^2$-O, —CO—, —S—, —S-Q$^2$-S—, —SO—, —SO$_2$—, C$_{1-24}$ alkylene or C$_{6-24}$ arylene. Examples of such polyisocyanates include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, isopropylbenzene-alpha-4-diisocyanate, and polymeric isocyanates such as polymethylene polyphenylisocyanate.

Q can also represent a polyurethane radical having a valence of i in which case $Q(NCO)_i$ is a composition known as a prepolymer. Such prepolymers are formed by reacting a stoichiometric excess of a polyisocyanate as above with an active hydrogen-containing component, especially the polyhydroxy-containing materials or polyols disclosed herein. In an aspect, the polyisocyanate is employed in proportions of 30 percent to 200 percent stoichiometric excess, the stoichiometry being based upon equivalents of isocyanate group per equivalent of hydroxyl in the polyol. The amount of polyisocyanate employed will vary slightly depending upon the nature of the polyurethane being prepared.

The active hydrogen-containing component can comprise a polyol (for example, a polyether polyol, a polyester polyol, or a combination thereof). Exemplary polyester polyols are inclusive of polycondensation products of polyols with dicarboxylic acids or ester-forming derivatives thereof (such as anhydrides, esters, and halides), polylactone polyols obtainable by ring-opening polymerization of lactones in the presence of polyols, polycarbonate polyols obtainable by reaction of carbonate diesters with polyols, or castor oil polyols. Exemplary dicarboxylic acids and derivatives of dicarboxylic acids that are useful for producing polycondensation polyester polyols are aliphatic or cycloaliphatic dicarboxylic acids such as glutaric, adipic, sebacic, fumaric or maleic acids; dimeric acids; aromatic dicarboxylic acids such as phthalic, isophthalic or terephthalic acids; tribasic or higher functional polycarboxylic acids such as pyromellitic acid; as well as anhydrides or second alkyl esters, such as maleic anhydride, phthalic anhydride or dimethyl terephthalate.

Additional active hydrogen-containing components are the polymers of cyclic esters. Suitable cyclic ester monomers include, but are not limited to δ-valerolactone, ε-caprolactone, zeta-enantholactone, the monoalkyl-valerolactones, e.g., the monomethyl-, monoethyl-, and monohexyl-valerolactones. Suitable polyester polyols include caprolactone based polyester polyols, aromatic polyester polyols, ethylene glycol adipate based polyols, and mixtures comprising any one of the foregoing polyester polyols. Exemplary polyester polyols are polyester polyols made from ε-caprolactones, adipic acid, phthalic anhydride, terephthalic acid, or dimethyl esters of terephthalic acid.

The polyether polyols are obtained by the chemical addition of alkylene oxides, such as ethylene oxide, propylene oxide and mixtures thereof, to water or polyhydric organic components, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy) hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl] propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Exemplary alkylene oxides are propylene oxide and mixtures of propylene oxide with ethylene oxide. The polyols listed above can be used per se as the active hydrogen component.

Exemplary polyether polyols can be represented generally by the formula $R[(OC_nH_{2n})_zOH]_a$ wherein R is hydrogen or a polyvalent hydrocarbon radical; a is an integer (i.e., 1 or 2 to 6 to 8) equal to the valence of R, n in each occurrence is an integer from 2 to 4 inclusive (specifically 3) and z in each occurrence is an integer having a value of from 2 to 200, specifically from 15 to 100. In an aspect, the polyether polyol comprises a mixture of one or more of dipropylene glycol, 1,4-butanediol, 2-methyl-1,3-propanediol, or the like, or a combination thereof.

Other examples of active hydrogen-containing materials include polymer polyol compositions obtained by polymerizing ethylenically unsaturated monomers in a polyol. Exemplary monomers for producing such compositions include acrylonitrile, vinyl chloride, styrene, butadiene, vinylidene chloride, and other ethylenically unsaturated monomers. The polymer polyol compositions comprise higher than or equal to 1, specifically higher than or equal to 5, and more specifically higher than or equal to 10 weight percent (wt %) of monomer polymerized in the polyol where the weight percent is based on the total amount of polyol. In an aspect, the polymer polyol compositions comprise less than or equal to 70 wt %, specifically less than or equal to 50 wt %, more specifically less than or equal to 40 wt % of monomers polymerized in the polyol. Such compositions are conveniently prepared by polymerizing the monomers in the selected polyol at a temperature of 40 to 150° C. in the presence of a free radical polymerization catalyst such as peroxides, persulfates, percarbonate, perborates, azo compounds, or the like.

The active hydrogen-containing component can also include polyhydroxy-containing compounds, such as hydroxy-terminated polyhydrocarbons, hydroxy-terminated polyformals, fatty acid triglycerides, hydroxy-terminated polyesters, hydroxymethyl-terminated perfluoromethylenes, hydroxy-terminated polyalkylene ether glycols hydroxy-terminated polyalkylenearylene ether glycols, and hydroxy-terminated polyalkylene ether triols.

The polyol can have a hydroxyl number that varies over a wide range. For example, the hydroxyl number of the polyol, including other cross-linking additives, if employed, can be 28 to 1,000, or 100 to 800. The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives.

A variety of blowing agents or a mixture of blowing agents are suitable, particularly water, where a blowing agent is used. The water reacts with the isocyanate component to yield $CO_2$ gas, which provides the additional blowing necessary. In an aspect when water is used as the blowing agent, the curing reaction is controlled by selectively using catalysts. In an aspect, compounds that decompose to liberate gases (e.g., azo compounds) can also be used.

Exemplary blowing agents are physical blowing agents that include hydrogen atom-containing components, which can be used alone or as mixtures with each other or with another type of blowing agent such as water or azo compounds. These blowing agents can be chosen from a broad range of materials, including hydrocarbons, ethers, esters and partially halogenated hydrocarbons, ethers and esters, or the like. Examples of physical blowing agents have a boiling point from −50 to 100° C., or from −50 to 50° C. Among the hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, (Z)-1,1,1,4,4,4-hexafluoro-2-butene, and pentafluoroethane; the HFE's (halo fluoroethers) such as methyl-1,1,1-trifluoroethylether and difluoromethyl-1,1,1-trifluoroethylether; and the hydrocarbons such as n-pentane, isopentane, and cyclopentane. Typically, physical blowing agents can be used in an amount of 0.5 to 50 wt %, or 3 to 30 wt % based on the total weight of the reactive composition.

Exemplary chemical blowing agents include water, azo compounds such as azoisobutyronitrile, azodicarbonamide (i.e., an azo-bis-formamide), barium azodicarboxylate, or the like; a substituted hydrazine such as diphenylsulfone-3,3'-disulfohydrazide, 4,4'-hydroxy-bis-(benzenesulfohydrazide), trihydrazinotriazine, aryl-bis-(sulfohydrazide), or the like; a semicarbazide such as p-tolylene sulfonyl semicarbazide, 4,4'-hydroxy-bis-(benzenesulfonyl semicarbazide) or the like; a triazole such as 5-morpholyl-1,2,3,4-thiatriazole or the like; an N-nitroso compound such as N,N'-dinitrosopentamethylene tetraamine, N,N-dimethyl-N,N'-dinitrosophthalmide, or the like; a benzoxazine such as isatoic anhydride or the like; or a mixture (for example, a sodium carbonate/citric acid mixture). The chemical blowing agent can include water. For example, the blowing agent can include an ammonium salt, a phosphate, a polyphosphate, a borate, a polyborate, a sulphate, a urea, a urea-formaldehyde resin, a dicyandiamide, or a melamine.

The amount of the chemical blowing agents will vary depending on the agent and the desired foam density, and is readily determinable by one of ordinary skill in the art. For example, chemical blowing agents can be used in an amount of 0.1 to 10 wt % based on the total weight of the reactive composition. The decomposition products formed during the decomposition process can be physiologically safe, and without significantly adversely affect the thermal stability or mechanical properties of the polymer foam.

A number of the catalysts can be used to catalyze the reaction of the isocyanate component with the active hydrogen-containing component. Such catalysts include organic and inorganic acid salts of, or organometallic derivatives of bismuth, lead, tin, iron, antimony, uranium, cadmium, cobalt, thorium, aluminum, mercury, zinc, nickel, cerium, molybdenum, vanadium, copper, manganese, or zirconium, as well as phosphines or tertiary organic amines. Exemplary catalysts include dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N',N'-tetramethyl-1,3-butanediamine, N,N-dimethylethanolamine, N,N-diethylethanolamine, 1,3,5-tris (N,N-dimethylaminopropyl)-s-hexahydrotriazine, o- and p-(dimethylaminomethyl) phenols, 2,4,6-tris(dimethylaminomethyl) phenol, N,N-dimethylcyclohexylamine, pentamethyldiethylenetriamine, 1,4-diazobicyclo [2.2.2] octane, N-hydroxyl-alkyl quaternary ammonium carboxylates, tetramethylammonium formate, tetramethylammonium acetate, tetramethylammonium 2-ethylhexanoate, or the like, or a combination thereof.

For example, the catalyst can be a metal acetylacetonate including a metal such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc, zirconium, or a combination thereof. An exemplary catalyst can include bis(2,4-pentanedionate) nickel (II) (also known as nickel acetylacetonate or diacetylacetonate nickel) or derivatives thereof, such as diacetonitrilediacetylacetonato nickel, diphenylnitrilediacetylacetonato nickel, or bis(triphenylphosphine)diacetyl acetylacetonato nickel. Ferric acetylacetonate (FeAA) is also a suitable catalyst, due to its relative stability, good catalytic activity, and lack of toxicity. In an aspect, the metal acetylacetonate is conveniently added by pre-dissolution in a suitable solvent such as dipropylene glycol or other hydroxyl containing components which will then participate in the reaction and become part of the final product. The amount of catalyst present in the reactive composition can be 0.03 to 3 wt %, based on the total weight of the active hydrogen-containing component. In an aspect, the foam is formed using a delayed action catalyst and process as described in U.S. Pat. No. 7,338,983.

The reactive composition can include a surfactant that can stabilize the reactive composition before curing. The surfactant can include an organosilicon surfactant. The organosilicon can be a copolymer comprising or consisting essentially of $SiO_2$ (silicate) units and $(CH_3)_3SiO_{0.5}$ (trimethylsiloxy) units in a molar ratio of silicate to trimethylsiloxy units of 0.8:1 to 2.2:1, or 1:1 to 2.0:1. The organosilicone can include a partially cross-linked siloxane-polyoxyalkylene block copolymer, wherein the siloxane blocks and polyoxyalkylene blocks are linked by silicon to carbon bonding, or by silicon to oxygen to carbon bonding. The surfactant can be present in an amount of 0.5 to 10 wt %, or 1 to 6 wt % based on the total weight of the active hydrogen component.

Other, optional additives can be added to the reactive composition. For example, the additive can include a filler (for example, alumina trihydrate, silica, talc, calcium carbonate, or clay), a dyes, a pigment (for example, titanium dioxide or iron oxide), an antioxidant, an antiozonant, an ultraviolet (UV) or other light stabilizer, or the like, or a combination thereof.

In a method of producing the polyurethane foams, the components for producing the foams, i.e., the isocyanate component, the active hydrogen-containing component, surfactant, catalyst, optional blowing agents, and other additives are first mixed together then subjected to mechanical frothing with air. Alternatively, the components can be added sequentially to the liquid phase during the mechanical frothing process. The gas phase of the froths is most specifically air because of its cheapness and ready availability. However, if desired, other gases can be used which are gaseous at ambient conditions and which are substantially inert or non-reactive with any component of the liquid phase. Such other gases include, for example, nitrogen, carbon dioxide, and fluorocarbons that are normally gaseous at ambient temperatures. The inert gas can be incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation specifically is conducted at pressures not higher than 7 to 14 kilograms per square centimeter (kg/cm$^2$) (100 to 200 pounds per square inch (psi)). Readily available mixing equipment can be used, and no special equipment is generally necessary. The amount of inert gas beaten into the liquid phase is controlled by gas flow metering equipment to produce a froth of the desired density. The mechanical beating is conducted over a period of a few seconds in an Oakes mixer, or 3 to 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., 10 to 40° C.

In an aspect, the compressible polymer foam layer can be an open cell, low modulus polyurethane foam that can have an average cell size of 50 to 250 µm, as measured in accordance with ASTM D 3574-95; a density of 80 to 481 kg/m$^3$, more preferably 128 to 400 kg/m$^3$; and a compression force deflection of 5 to 1,035 kPa, preferably 10 to 500 kPa, at 25% deflection determined in accordance with ASTM D3574-17. In an aspect, the polyurethane foam can further have a compression force deflection of 100 to 500 kPa at 75% deflection determined in accordance with ASTM D3574-17; a compression set of less than 15%; a SAG factor as defined by the compression force deflection at 65% divided by the compression force deflection at 25% of less than or equal to 3; or a combination thereof. Such materials are marketed under the name PORON by the Rogers Corporation, Chandler, AZ PORON foams have been formulated to provide an excellent range of properties, including compression set resistance. Foams with good compression set resistance provide cushioning and maintain their original shape or thickness under loads for extended periods.

In an aspect, the compressible polymer foam layer can be a thermoset silicone foam. The silicone foams can be produced by a reaction between water and hydride groups in a reactive polysiloxane composition with the consequent liberation of hydrogen gas. In an aspect, the polysiloxane polymer has a viscosity of 100 to 1,000,000 poise at 25° C. and has chain substituents such as hydride, methyl, ethyl, propyl, vinyl, phenyl, and trifluoropropyl. The end groups on the polysiloxane polymer can be hydride, hydroxyl, vinyl, vinyl diorganosiloxy, alkoxy, acyloxy, allyl, oxime, aminoxy, isopropenoxy, epoxy, mercapto groups, or other known, reactive end groups. Suitable silicone foams can also be produced by using several polysiloxane polymers, each having different molecular weights (e.g., bimodal or trimodal molecular weight distributions) if the viscosity of the combination lies within the above specified values. It is also possible to have several polysiloxane base polymers with different functional or reactive groups to produce the desired foam. In an aspect, the polysiloxane comprises 0.2 moles of hydride (Si—H) groups per mole of water.

Physical or chemical blowing agents can be used to produce the silicone foam, including the physical and chemical blowing agents described herein. Other examples of chemical blowing agents include benzyl alcohol, methanol, ethanol, isopropyl alcohol, butanediol, and silanols. In an aspect, a combination of methods of blowing is used to obtain foams having desirable characteristics. For example, a physical blowing agent such as a chlorofluorocarbon can be added as a secondary blowing agent to a reactive mixture wherein the primary mode of blowing is the hydrogen released as the result of the reaction between water and hydride substituents on the polysiloxane.

Suitable reactive silicone compositions are 1:1 liquid silicone rubber (LSR) or liquid injection molded (LIM) compositions. Use of the low durometer LSR or LIM results in formation of a soft foam. In an aspect, LSR or LIM systems are provided as two-part formulations suitable for mixing in ratios of 1:1 by volume. The "A" part of the formulation comprises one or more polysiloxanes having two or more alkenyl groups and has an extrusion rate of less than 500 grams per minute (g/minute). Suitable alkenyl groups are exemplified by vinyl, allyl, butenyl, pentenyl, hexenyl, and heptenyl, with vinyl being particularly suitable. The alkenyl group can be bonded at the molecular chain terminals, in pendant positions on the molecular chain, or both. Other silicon-bonded organic groups in the polysiloxane having two or more alkenyl groups are exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The alkenyl-containing polysiloxane can have straight chain, partially branched straight chain, branched-chain, or network molecule structure, or can be a mixture of two or more selections from polysiloxanes with the exemplified molecular structures. The alkenyl-containing polysiloxane is exemplified by trimethylsiloxy-endblocked dimethylsiloxane-methylvinylsiloxane copolymers, trimethylsiloxy-endblocked methylvinylsiloxane-methylphenylsiloxane copolymers, trimethylsiloxy-end blocked dimethylsiloxane-methylvinylsiloxane-methylphenylsiloxane copolymers, dimethylvinylsiloxy-endblocked dimethylpolysiloxanes, dimethylvinylsiloxy-endblocked methylvinylpolysiloxanes, dimethylvinylsiloxy-endblocked methylvinylphenylsiloxanes, dimethylvinylsiloxy-endblocked dimethylvinylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-diphenylsiloxane copolymers, polysiloxane comprising $R_3SiO_{1/2}$ and $SiO_{4/2}$ units, polysiloxane comprising $RSiO_{3/2}$ units, polysiloxane comprising the $R_2SiO_{2/2}$ and $RSiO_{3/2}$ units, polysiloxane comprising the $R_2SiO_{2/2}$, $RSiO_{3/2}$ and $SiO_{4/2}$ units, and a mixture of two or more of the preceding polysiloxanes. R represents substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl, with the proviso that at least 2 of the R groups per molecule are alkenyl.

The "B" component of the LSR or LIM system comprises one or more polysiloxanes that contain at least two silicon-bonded hydrogen atoms per molecule and has an extrusion rate of less than 500 g/minute. The hydrogen can be bonded at the molecular chain terminals, in pendant positions on the molecular chain, or both. Other silicon-bonded groups are organic groups exemplified by non-alkenyl, substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The hydrogen-containing polysiloxane component can have straight-chain, partially branched straight-chain, branched-chain, cyclic, network molecular structure, or can be a mixture of two or more selections from polysiloxanes with the exemplified molecular structures. The hydrogen-containing polysiloxane is exemplified by trimethylsiloxy-endblocked methylhydrogenpolysiloxanes, trimethylsiloxy-endblocked dimethylsiloxane-methylhydrogensiloxane copolymers, trimethylsiloxy-endblocked methylhydrogensiloxane-methylphenylsiloxane copolymers, trimethylsiloxy-endblocked dimethylsiloxane-methylhydrogensiloxane-methylphenylsiloxane copolymers, dimethylhydrogensiloxy-endblocked dimethylpolysiloxanes, dimethylhydrogensiloxy-endblocked methylhydrogenpolysiloxanes, dimethylhydrogensiloxy-endblocked dimethylsiloxanes-methylhydrogensiloxane copolymers, dimethylhydrogensiloxy-endblocked dimethylsiloxane-methylphenylsiloxane copolymers, and dimethylhydrogensiloxy-endblocked methylphenylpolysiloxanes.

The hydrogen-containing polysiloxane component is added in an amount sufficient to cure the composition, specifically in a quantity of 0.5 to 10 silicon-bonded hydrogen atoms per alkenyl group in the alkenyl-containing polysiloxane.

The silicone composition further comprises, generally as part of Component "A," a catalyst such as platinum to accelerate the cure. Platinum and platinum compounds known as hydrosilylation-reaction catalysts can be used, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of a platinum addition-reaction catalyst in a thermoplastic resin such as methyl methacrylate, polycarbonate, polystyrene, silicone, and the like. Mixtures of catalysts can also be used. A quantity of catalyst effective to cure the present composition is generally from 0.1 to 1,000 parts per million (by weight) of platinum metal based on the combined amounts of alkenyl and hydrogen components.

Various platinum catalyst inhibitors can also be used to control the kinetics of the blowing and curing reactions to control the porosity and density of the silicone foams. Examples of such inhibitors include polymethylvinylsiloxane cyclic compounds and acetylenic alcohols. These inhibitors should not interfere with the foaming and curing in such a manner that destroys the foam. The inhibitors can be present as part of Component "A."

The silicone of the compressible polymer foam layer can have a density of 80 to 481 kg/m$^3$, more preferably 160 to 240 kg/m$^3$. The silicone can further have an average cell size of 10 to 500, or 50 to 250 pin, as may be measured, for example, in accordance with ASTM D 3574-95; a compression force deflection of 5 to 1,035 kilopascal (kPa), or 5 to 500 kPa, at 25% deflection determined in accordance with ASTM D3574-17; or a combination thereof. The silicone for the compressible polymer foam layer can further have a compression force deflection of 100 to 500 kPa at 75% deflection determined in accordance with ASTM D3574-17; a compression set of less than 15%; a SAG factor (as defined by the compression force deflection at 65% divided by the compression force deflection at 25%) of less than or equal to 3; or a combination thereof. In an aspect, the compressible polymer foam layer has a combination of at least two, preferable all, of the foregoing properties.

The flame retardant layer is selected to provide a flame retardance rating of V0, HF1, or a combination thereof to the multilayer material, and to not significantly affect the cushioning properties of the multilayer material.

Various polymers can be used in the flame retardant layer to provide the desired properties, including the thermoplastic or thermoset polymers as described above. Preferred polymers are flexible at the thicknesses used. Specific polymers that can be used include a polyamide, a polyamideimide, a polyarylate, a polyarylene ether, a polyarylene sulfide, a polycarbonate, a polyester (such as an alkyd, a polyethylene terephthalate, or the like), a polyetheretherketone, a polyetherimide, a polyetherketoneketone, a polyetherketone, a polyethersulfone, a polyimide (such as a polyetherimide), a poly($C_{1-6}$ alkyl) methacrylate, a polyphthalide, a polyolefin (such as a fluorinated polyolefin), a polysilazane, a polysiloxane, a polyvinyl alcohol, a polyvinyl ester, a polyvinyl ether, a polyvinyl ketone, a polyvinylidene fluoride, a polyvinyl ester, a crosslinked polyester, an epoxy, a polyurethane, a silicone, or a combination thereof.

In an aspect, the flame retardant layer includes a polyaramid fabric. Flame retardance can be determined according to the procedure of Underwriter's Laboratory Bulletin 94 entitled "Tests for Flammability of Plastic Materials, UL94." According to this procedure, in a sample is placed so that its long axis is 180 degrees to the flame. Five-bar flame out time (FOT) is the sum of the flame out time after removing the igniting flame for five samples, each lit twice for a maximum flame out time of 50 seconds. FOT1 is the average flame out time after the first light. FOT2 is the average flame out time after the second light. Desirably, FOT1 values for a sample in which the flame retardant layer includes a polyaramid fabric can range, for example, from 0.9 to 3.2 seconds, and FOT2 values for such samples can range, for example, from 0.7 to 4.1 seconds, respectively.

In an aspect, the flame retardant layer comprises a polyester, specifically a polyethylene terephthalate.

An optional additive can be present in the flame retardant layer. For example, the additive can include a filler (for example, alumina trihydrate, silica, talc, calcium carbonate, or clay), a dye, a pigment (for example, titanium dioxide or iron oxide), an antioxidant, an antiozonant, an ultraviolet (UV) or other light stabilizer, or the like, or a combination thereof.

Each of the compressible polymer foam layer and the flame retardant layer includes a flame retardant additive composition.

These flame retardant additive compositions may include any compound or particulate additive that increases the burn resistivity, particularly flame spread such as tested by UL 94, of the multilayer material. Some useful flame retardants include those that operate by forming a char-layer across the surface of a specimen when exposed to a flame. Other flame retardants include those that operate by releasing water upon thermal decomposition of the flame retardant compound. A flame retardant synergist can be present in the composition, for example antimony oxide.

In an aspect, the flame retardant additive composition included in each of the compressible polymer foam layer and the flame retardant layer independently includes a metal hydroxide, a metal oxide, a metal borate, a metal carbonate, a melamine (e.g., melamine cyanurate, melamine phosphate, melamine polyphosphate, or the like), a halogenated aromatic compound (e.g., a brominated compound), a guanidine, a carbon black, an expandable graphite, a nanoclay, an organic phosphorus-containing compound (e.g., an aromatic phosphine oxide, an aromatic phosphate, a phosphinic acid, a phosphinate, a phosphazene, a phosphenathrene oxide such as 10-dihydro-9-oxa-10 phosphenathrene-10-oxide (DOPO), and 10-(2,5-dihydroxyphenyl)-10-H-9-oxa-10-phosphaphenanthrene-10-oxide (ODOPB)), a silazane, a Rimar salt, or a combination thereof.

Exemplary metal hydroxide flame retardants contain aluminum, magnesium, zinc, boron, calcium, nickel, cobalt, tin, molybdenum, copper, iron, titanium, or a combination thereof, for example aluminum trihydroxide, magnesium hydroxide, calcium hydroxide, iron hydroxide, and the like. Exemplary metal oxide flame retardants include antimony oxide, antimony trioxide, antimony pentoxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, tungsten oxide, and the like. Exemplary metal borate flame retardants include zinc borate, zinc metaborate, barium metaborate, and the like. Exemplary metal carbonate flame retardants include zinc carbonate, magnesium carbonate, calcium carbonate, barium carbonate, and the like.

Exemplary halogen-containing flame retardants include aromatic brominated or chlorinated flame retardant such as tribromoneopentyl alcohol, tris(2-chloroisopropyl)phosphate, tris(dichloropropyl)phosphate, chlorinated alkyl phosphate ester, a halogenated aryl ester/aromatic phosphate blend, pentabromobenzyl alkyl ethers, brominated epoxies, alkylated triphenyl phosphate esters, or a combination thereof. However, in an aspect, flame retardant composition does not include a halogenated flame retardant.

Exemplary aromatic phosphorus-containing flame retardants include aromatic phosphates such as diphenyl pentaerythritol diphosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like; a phosphinic acid, phosphinate, or zinc or aluminum metal salt thereof, such as diphosphinic acids, dimethylphosphinic acid, ethylmethylphosphinic acid, diethylphosphinic acid; aromatic phosphine oxides are isobutylbis(hydroxyalkyl) phosphine oxide and 1,4-diisobutylene-2,3,5,6-tetrahydroxy-1,4-diphosphine oxide or 1,4-diisobutylene-1,4-diphosphoryl-2,3,5,6-tetrahydroxycyclohexane. Such compounds are known in the art, and examples of phosphorus-containing compounds that are commercially available include those available under the trade names NH1197 (Chemtura Corporation), NH1511 (Chemtura Corporation), NCENDX P-30 (Albemarle), HOSTAFLAM OP5500 (Clariant), HOSTAFLAM OP910 (Clariant), EXOLIT 935 (Clariant), and CYAGUARD RF 1204, CYAGUARD RF 1241 and CYAGUARD RF 1243R (Cytec Industries). In an aspect, an ammonium polyphosphate, which can be melamine coated, silane coated, or uncoated, can be used.

In an aspect, both the compressible polymer foam layer and the flame retardant layer can include a plurality of expandable graphite particles. In an aspect, only the flame retardant layer includes a plurality of expandable graphite particles (also known as expandable flake graphite, intumescent flake graphite, or expandable flake). The expandable graphite particles can be intercalated with intercalants such as halogens, alkali metals, sulfates, nitrates, various organic acids, aluminum chlorides, ferric chlorides, other metal halides, arsenic sulfides, thallium sulfides, or the like, or a combination thereof. In an aspect, the expandable graphite does not include a halogenated intercalant. The plurality of expandable graphite particles can be present in the flame retardant layer in an amount of 10 to 50 wt %, based on the total weight of the flame retardant layer.

The expandable graphite can have a mean or average size, e.g., diameter, of 30 μm to 1.5 mm, preferably 50 μm to 1.0 mm, more preferably 180 to 850 μm. For example, the expandable graphite can have a mean or average size, e.g., diameter, of at least 30 μm, preferably at least 180 μm, more preferably at least 300 μm. The expandable graphite can include a carbon content of 75 to 99 wt %, based on the weight of the expandable graphite. The expandable graphite can include a sulfur content of up to 8 wt %, or 2.6 to 5.0 wt %, preferably 3.0 to 3.5 wt %, based on the total weight of the expandable graphite. The expandable graphite can have an expansion ratio (mL/g) 10:1 to 500:1. For example, the expansion ratio (mL/g) can be 20:1 to 450:1, preferably 30:1 to 400:1, more preferably 50:1 to 350:1. The temperature at which expansion of the expandable graphite starts (also known as onset temperature or expansion temperature) can be 100 to 250° C. For example, the onset temperature can be 160 to 225° C., preferably 180 to 200° C.

The compressible polymer foam layer and the flame retardant layer can be prepared using any suitable method in the art, for example by casting, molding, calendaring, or the like. The flame retardant composition can be dispersed in the polymer of the compressible polymer foam layer or the flame retardant layer, disposed as a separate layer on the compressible polymer foam layer or the flame retardant layer, or both. For example, the flame retardant composition can be incorporated into the composition used to form the compressible polymer foam layer or the flame retardant layer or can be coated on the compressible polymer foam layer or the flame retardant layer (before or after curing, if a thermoset polymer) to form a film. When a separate film, the flame retardant composition can be disposed on a side of the flame retardant layer opposite the compressible polymer foam layer, disposed on a side of the compressible polymer foam layer opposite the flame retardant layer, disposed between the compressible polymer foam layer and the flame retardant layer, or a combination thereof.

In an aspect, the flame retardant composition is not present as a separate film that would increase the thickness of the compressible polymer foam layer. For example, the flame retardant composition can be impregnated into the compressible polymer foam and form a film within and coating an interior surface of the pores, as such a film would not significantly increase the thickness of the film. For example, the foam can be saturated with a liquid composition comprising the flame retardant composition, and then dried to remove the solvent. If the flame retardant composition is deposited on the foam by an immersion method such a dip coating, then an increased amount can be present, not only on a surface, but within the foam.

Methods for preparing the multilayer material include those known in the art. For example, an aspect, the multilayer material can be prepared by separate manufacture of the compressible polymer foam layer and the flame retardant layer, followed by contacting the layers under conditions effective to adhere the layers, for example lamination using heat and pressure. An adhesive can be used between the layers. Preferably an adhesive is not present, so that the thickness of the multilayer material is not significantly increased. If a thermoset is used in one or both of the compressible polymer foam layer and the flame retardant layer, each layer can be separately manufactured and one or both partially cured (B-staged). The layers can then be contacted and fully cured (e.g., by heat or by heat and pressure) to provide adhesion between the layers of the multilayer material.

In another aspect, one of the compressible polymer foam layer and the flame retardant layer can be premanufactured and then used as a substrate for manufacture of the other layer. For example, the reactive composition for formation of the compressible polymer foam layer can be cast onto a surface of the pre-formed flame retardant layer, followed by curing to provide the multilayer material. Polymer foam layers can be cast at a thickness of 4 mils (0.1 mm) or greater. Conversely, the compressible polymer foam layer can be manufactured, then a composition for forming the flame retardant layer can be cast, coated, or printed onto the compressible polymer foam layer to provide the multilayer material. The coating can be done, for example, by spray coating, dip coating, flow coating, roll coating, printing (e.g., inkjet printing), or the like. In an aspect, the flame retardant layer is coated or printed onto a polyurethane foam layer. The flame retardant composition that is coated or printed to form the flame retardant layer can include melamine, expandable graphite particles, boron clay, or a combination thereof. Desirably, FOT1 values for a sample in which the flame retardant layer includes a polyaramid fabric can range, for example, from 0.9 to 5.9 seconds, and FOT2 values for such samples can range, for example, from 0.9 to 1.1 seconds, respectively.

In an aspect, a film comprising the flame retardant composition can be formed on the multilayer material after manufacture as described above, for example by impregnation of a foam layer.

The multilayer material can have an average density of 50 to 1,000 kilograms per cubic meter (kg/m$^3$), preferably 50 to 500 kg/m$^3$, more preferably 100 to 250 kg/m$^3$. The density can be determined in accordance with ASTM D3574-95, Test A.

The multilayer material can have a compression force deflection of 5 to 1,035 kPa, preferably 10 to 500 kPa, or 25 to 250 kPa, or 25 to 80 kPa, at 25% deflection determined in accordance with ASTM D3574-17. "Compression force deflection at 25%" refers to the load that is required to physically compress the multilayer material by 25%.

The multilayer material can have a compression force deflection of 100 to 500 kPa, or 200 to 300 kPa, at 75% deflection.

The multilayer material can have a SAG factor of less than or equal to 3, wherein the SAG factor is defined by the compression force deflection at 65% divided by the compression force deflection at 25%.

The multilayer material can have a compression set of 0 to 15%, or 0 to 5%, at 50% deflection determined in accordance with ASTM D3574-95, Test D at 23° C. or 70° C.

In an aspect, the multilayer material can include a compressible polyurethane foam layer having a compression force deflection of 5 to 1,035 kPa at 25% deflection determined in accordance with ASTM D3574-17; and a flame retardant layer disposed on a first side of the compressible polymer foam layer, wherein the flame retardant layer comprises a solid, polymeric layer polymer foam layer, optionally including a plurality of expandable graphite particles, and wherein the multilayer material has a UL-94 rating of V0, HF1, or a combination thereof. The multilayer material can have a thickness of 1 to 5 mm. The compression force deflection can be 5 to 500 kPa, or 5 to 80 kPa at 25% deflection. The compressible polymer foam layer, for example a polyurethane foam layer, can have a compression force deflection of 100 to 500 kPa, or 200 to 300 kPa at 75% deflection determined in accordance with ASTM D3574-17.

The multilayer material is thin and lightweight, and yet provides a good combination of cushioning and flame retardant properties. The multilayer material is therefore useful in electronic devices. Electronic devices that can include the multilayer materials include televisions, radios, computers, medical instruments, business machines, communications equipment, and the like. The multilayer material is especially useful in hand-held electronic devices such as cellular telephones, personal digital assistants, and the like. The multilayer materials can be used in other applications, such as antennas or batteries (such as Li-ion batteries).

The following examples are merely illustrative and are not intended to limit this disclosure with respect to the devices, materials, conditions, or process parameters set forth herein.

EXAMPLES

The following examples demonstrate the flame retardance of the flame retardant multilayer materials.

Polyurethane foams for the multilayer materials were manufactured using formulations and methods as described in U.S. Pat. No. 7,338,983, in particular formulations in accordance with Examples 1 and 2 and methods in accordance with Example 3 of this patent.

Flame retardance was determined according to the procedure of Underwriter's Laboratory Bulletin 94 entitled "Tests for Flammability of Plastic Materials, UL94." According to this procedure, materials may be classified as V1, or V0, HF1, or a combination thereof based on the test results obtained for five samples at the specified sample thicknesses. Each of these flammability classifications are described below.

The criteria for obtaining a rating of V1 and V2 is as follows: In a sample placed so that its long axis is 180 degrees to the flame, the average period of flaming and/or smoldering after removing the igniting flame does not exceed twenty-five seconds and, for a V1 rating, none of the vertically placed samples produces drips of burning particles that ignite absorbent cotton. The V2 standard is the same as V1, except that drips are permitted.

The criteria for obtaining a rating of V0 is as follows: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow.

HF1 and HF2 are classifications that apply to low density foam materials. The criteria for obtaining a rating of HF1 is burning stops within 2 seconds; afterglow less than 30 s; no burning drips allowed, while the criteria for obtaining a rating of HF2 is burning stops within 3 seconds; afterglow less than 30 s; burning drips allowed.

Comparative Examples 1-10

Flexible polyurethane foams of different densities and thicknesses were tested for a rating of V0 according to the procedure of Underwriter's Laboratory Bulletin 94 entitled "Tests for Flammability of Plastic Materials, UL94." Results can be found in Table 1.

TABLE 1

| Comparative Example | Foam density (PCF) | Foam density (kg/m³) | Thickness (inches) | Thickness (mm) | UL V0 |
|---|---|---|---|---|---|
| 1 | 12.2 | 195 | 0.136 | 3.45 | Y |
| 2 | 11.7 | 187 | 0.128 | 3.25 | Y |
| 3 | 12.2 | 195 | 0.12 | 3.05 | Y |
| 4 | 14.2 | 227 | 0.099 | 2.51 | Y |
| 5 | 14.6 | 234 | 0.092 | 2.34 | Y |
| 6 | 12.7 | 203 | 0.111 | 2.8 | N |
| 7 | 13.4 | 215 | 0.100 | 2.5 | N |
| 8 | 13.8 | 221 | 0.100 | 2.5 | N |
| 9 | 15.4 | 247 | 0.075 | 1.91 | N |
| 10 | 17.7 | 284 | 0.062 | 1.57 | N |

Examples 1-13

Multilayer materials, made by casting and curing flexible polyurethane foams of different densities and thicknesses onto a 50 μm thick polyethylene terephthalate (PET) layer having a VTM-0 (e.g., very thin materials) flame rating according to the procedure of Underwriter's Laboratory Bulletin 94 entitled "Tests for Flammability of Plastic Materials, UL94," were tested for a rating of V0 according to the procedure of Underwriter's Laboratory Bulletin 94 entitled "Tests for Flammability of Plastic Materials, UL94." Results can be found in Table 2 The densities and thicknesses listed in Table 2 are for the multilayer materials as a whole.

TABLE 2

| Example | Multilayer material overall density (PCF) | Multilayer material overall density (kg/m³) | Multilayer material overall thickness (inches) | Multilayer material overall thickness (mm) | UL V0 |
|---|---|---|---|---|---|
| 1 | 12.7 | 203 | 0.125 | 3.2 | Pass |
| 2 | 12.8 | 205 | 0.108 | 2.74 | Pass |
| 3 | 13.4 | 215 | 0.107 | 2.7 | Pass |
| 4 | 13.9 | 223 | 0.100 | 2.5 | Pass |
| 5 | 13.4 | 215 | 0.097 | 2.5 | Pass |
| 6 | 13.8 | 221 | 0.090 | 2.3 | Pass |
| 7 | 13.3 | 213 | 0.075 | 1.9 | Pass |
| 8 | 13.2 | 211 | 0.072 | 1.83 | Pass |
| 9 | 12.8 | 205 | 0.069 | 1.75 | Pass |
| 10 | 14.2 | 227 | 0.068 | 1.7 | Pass |
| 11 | 13.8 | 221 | 0.068 | 1.7 | Partial Pass |
| 12 | 13.4 | 215 | 0.068 | 1.7 | N |
| 13 | 13.3 | 213 | 0.039 | 1.0 | N |

As can be seen from the data in the above table, a suitable combination of a compressible polymer foam layer and a solid, polymeric flame retardant layer can provide a combination of overall density and thickness (for example, a density ranging from 12.7 PCF (203 kg/m³) to 14.2 PCF (227 kg/m³) and a thickness ranging from 0.068 inches (1.7 mm)) to 0.125 inches (3.2 mm)) and resultant desirable flame retardance.

Figure 2:
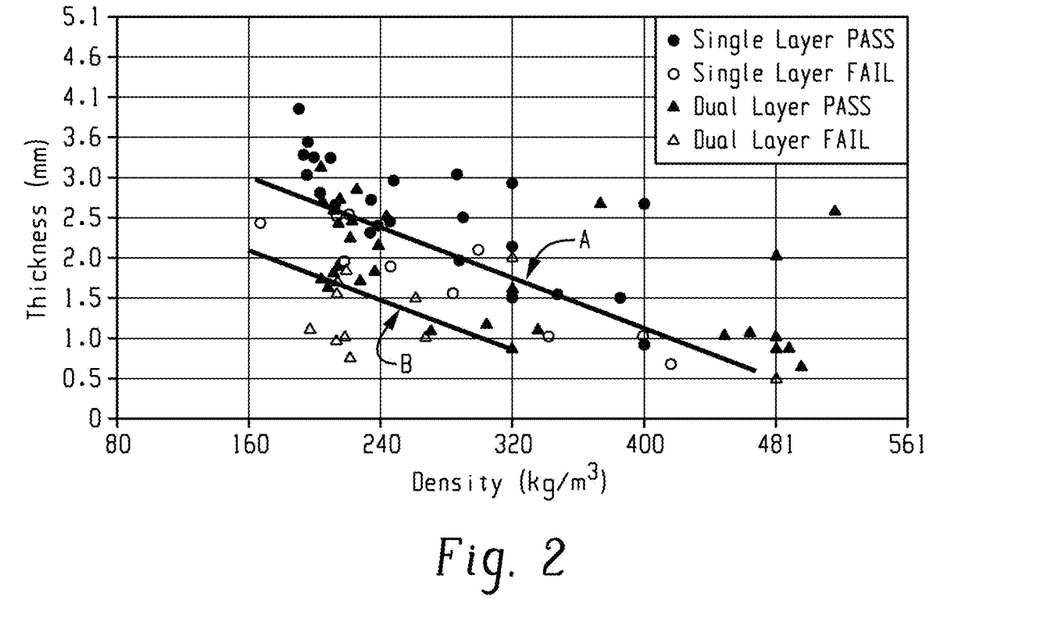
FIG. 2 is a graph of thickness (mm) versus density ($kg/m^3$)) for single layer polyurethane foam samples and dual layer samples including a polyurethane foam layer and a solid, polymeric flame retardant layer.

FIG. 2 is a plot of overall thickness (mm) versus overall density (kg/m³) for single layer polyurethane foam samples and dual layer samples including a polyurethane foam layer and a solid, polymeric flame retardant layer. Line "A" represents an approximate demarcation between V0 pass and V0 fail for the single layer samples, and line "B" represents an approximate demarcation between V0 pass and V0 fail for the dual layer samples. As can be seen from the plot, V0 pass for the dual layer samples can be achieved at thinner thicknesses than for the single layer samples. For example, at an overall density of 240 kg/m³, a single layer sample would pass V0 at a thickness of about 2.5 mm, and a dual layer sample would pass V0 at an overall thickness of about 1.5 mm.

Set forth below are various non-limiting aspects of the disclosure.

Aspect 1: A multilayer material, comprising a compressible polymer foam layer, wherein the compressible polymer foam layer has a density of less than 400 kg/m³ (25 lb/ft³), a compression force deflection of 5 to 1,035 kPa at 25% deflection determined in accordance with ASTM D3574-17, and a thickness of less than 3.5 millimeters (130 mils); and a solid, polymeric flame retardant layer disposed on a first side of the compressible polymer foam layer, wherein the flame retardant layer has a thickness of less than 0.3 millimeters (11.8 mil), wherein the thickness of the compressible polymer foam layer is at least two times greater than the thickness of the flame retardant layer; wherein each of the compressible polymer foam layer and the flame retardant layer comprises a flame retardant composition, and wherein the multilayer material has a thickness of 3.5 millimeters (130 mils) or less, and a UL-94 rating of V1, preferably V0, HF1, or a combination thereof.

Aspect 2: The multilayer material of aspect 1, wherein the compressible polymer foam layer has a density of 80 to 400 kg/m³ (5 to 25 lb/ft³), or 128 to 320 kg/m³ (8 to 20 lb/ft³) or 160 to 288 kg/m³ (10 to 18 lb/ft³) or 192 to 288 kg/m³ (12 to 18 lb/ft³); and compression force deflection of 5 to 500 kPa, at 25% deflection determined in accordance with ASTM D3574-17.

Aspect 3: The multilayer material of any one of the preceding aspects, wherein the compressible polymer foam layer has a thickness of 0.1 to less than 3.5 millimeters (0.04 to less than 0.14 inches), or 0.1 to 3.3 millimeters (0.04 to 0.13 inches), or 0.1 to 3 millimeters (0.04 to 0.118 inches).

Aspect 4: The multilayer material of any one of the preceding aspects, wherein the compressible polymer foam layer further has a compression force deflection of 5 to 1,035 kPa, preferably 10 to 500 kPa at 25% deflection determined in accordance with ASTM D3574-17; a compression force deflection of 100 to 500 kPa at 75% deflection determined in accordance with ASTM D3574-17; a compression set of 0 to 15%, at 50% deflection determined in accordance with ASTM D3574-95, Test D at 23° C. or 70° C. or a combination thereof.

Aspect 5: The multilayer material of aspect 1, wherein the compressible polymer foam comprises a polyacetal, a poly ($C_{1-6}$ alkyl) acrylate, a polyacrylic, a polyamide, a polyamideimide, a polyanhydride, a polyarylate, a polyarylene ether, a polyarylene sulfide, a polybenzoxazole, a polycarbonate, a polyester, a polyetheretherketone, a polyetherimide, a polyetherketoneketone, a polyetherketone, a polyethersulfone, a polyisocyanurate, a polyimide, a poly($C_{1-6}$ alkyl) methacrylate, a poly((meth)acrylic acid), a polyphthalide, a polyolefin (such as a fluorinated polyolefin), a polysilazane, a polystyrene, a polysulfide, a polysulfonamide, a polysulfonate, a polythioester, a polytriazine, a polyurea, a polyvinyl alcohol, a polyvinyl ester, a polyvinyl ether, a polyvinyl halide, a polyvinyl ketone, a polyvinylidene fluoride, a polyvinyl ester, a crosslinked poly(ester), an epoxy, a melamine, phenolic polymer, a polyurethane, a urea-formaldehyde, a silicone, a natural rubber, polychloroprene, an ethylene-propylene-diene monomer (EPDM) rubber, or a combination thereof; preferably wherein the compressible polymer foam comprises an epoxy, a polyurethane, or a combination thereof.

Aspect 6: The multilayer material of any one of the preceding aspects, wherein the compressible polymer foam comprises a polyurethane foam.

Aspect 7: The multilayer material of any one of the preceding aspects, wherein the flame retardant layer has a density of 240 to 1,000 kg/m$^3$ (15 to 62 lb/ft$^3$), or 288 to 1,000 kg/m$^3$ (18 to 62 lb/ft$^3$), or 350 to 950 kg/m$^3$ (22 to 59 lb/ft$^3$), or 400 to 950 kg/m$^3$ (25 to 59 lb/ft$^3$).

Aspect 8: The multilayer material of aspect 7, wherein the flame retardant layer comprises polyethylene terephthalate, preferably polyethylene terephthalate having a VTM-0 flame rating.

Aspect 9: The multilayer material of any one of the preceding aspects, wherein the flame retardant composition of each of the compressible polymer foam layer and the flame retardant layer independently comprises a metal hydroxide, a metal oxide, a metal borate, a metal carbonate, a melamine, a halogenated aromatic compound, a guanidine, a carbon black, an expandable graphite, a nanoclay, an organic phosphorus-containing compound, a silazane, a Rimar salt, or a combination thereof.

Aspect 10: The multilayer material of any one of the preceding aspects, wherein the flame retardant composition of each of the compressible polymer foam layer and the flame retardant layer independently does not comprise a halogenated flame retardant or an antimony compound.

Aspect 11: The multilayer material of any one of the preceding aspects, having a compression force deflection of 5 to 1,035 kPa, preferably 10 to 500 kPa, or 25 to 250 kPa, or 25 to 80 kPa, at 25% deflection determined in accordance with ASTM D3574-17; a compression force deflection of 100 to 500 kPa, or 200 to 300 kPa, at 75% deflection; a compression set of 0 to 15%, or 0 to 5%, at 50% deflection determined in accordance with ASTM D3574-95, Test D at 23° C. or 70° C.; or a combination thereof.

Aspect 12: The multilayer material of aspect 11, wherein the compressible polymer foam layer comprises polyurethane.

Aspect 13: A method of preparing the multilayer material of any one of aspects 1 to 12, the method comprising forming the compressible polymer foam layer and the flame retardant layer; and contacting the compressible polymer foam layer and the flame retardant layer under conditions effective to adhere the layers to form the multilayer material.

Aspect 14: A method of preparing the multilayer material of any one of aspects 1 to 12, the method comprising forming one of the compressible polymer foam layer and the flame retardant layer; and forming the other of the compressible polymer foam layer and the flame retardant layer onto a surface of the formed layer to provide the multilayer material.

Aspect 15: The method of aspect 14, comprising forming the compressible polymer foam layer; then forming the flame retardant layer on the first side of the compressible polymer foam layer, preferably wherein forming the flame retardant layer comprises coating or printing the flame retardant composition onto the first side of the compressible polymer foam layer.

Aspect 16: An electronic device comprising the multilayer material of any one of aspects 1 to 12, preferably wherein the device is a hand-held electronic device.

The compositions, methods, and devices can alternatively comprise, consist of, or consist essentially of, any appropriate materials, steps, or components herein disclosed. The compositions, methods, and devices can additionally, or alternatively, be formulated so as to be devoid, or substantially free, of any materials (or species), steps, or components, that are otherwise not necessary to the achievement of the function or objectives of the compositions, methods, and devices.

The terms "a" and "an" do not denote a limitation of quantity, but rather denote the presence of at least one of the referenced item. The term "or" means "and/or" unless clearly indicated otherwise by context. Reference throughout the specification to "an aspect", "another aspect", "and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer is referred to as being "on" another element, it can be directly on the other element or intervening elements can also be present. In contrast, when an element is referred to as being "directly on" another element, there are no intervening elements present. The layer can be disposed on or disposed directly on a portion of a surface of the element or on the entire surface of the element.

Unless specified to the contrary herein, all test standards are the most recent standard in effect as of the filing date of this application, or, if priority is claimed, the filing date of the earliest priority application in which the test standard appears.

As used herein, the "diameter" of a particle refers to a diameter of a sphere or an equivalent diameter obtained from a particle size analyzer or from a two-dimensional image of an electron microscopy analysis, for example a transmission electron microscopy image analyzed using a program such as Image J. In an aspect, "a size" refers to a size of a single particle or a (e.g., a mean or a median) average of particles or a population of particles.

The endpoints of all ranges directed to the same component or property are inclusive of the endpoints, are independently combinable, and include all intermediate points and ranges. The terms "first," "second," and the like, "primary," "secondary," and the like, as used herein do not denote any order, quantity, or importance, but rather are used to distinguish one element from another. The term "combination thereof" or "at least one of" are open, and mean that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical, and scientific terms used herein have the same meaning as is commonly understood by one of skill in the art to which this disclosure belongs.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present disclosure takes precedence over the conflicting term from the incorporated reference.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A dual layer material, comprising
   a compressible polymer foam layer, wherein the compressible polymer foam layer has
      a density of less than 400 kg/m$^3$,
      a compression force deflection of 5 to 1,035 kPa at 25% deflection determined in accordance with ASTM D3574-17, and
      a thickness of less than 3.5 millimeters; and
   a solid, polymeric flame retardant layer disposed on a first side of the compressible polymer foam layer, wherein the flame retardant layer has
      a thickness of less than 0.3 millimeters, wherein the thickness of the compressible polymer foam layer is at least two times greater than the thickness of the flame retardant layer;
   wherein each of the compressible polymer foam layer and the flame retardant layer comprises a flame retardant composition,
   wherein the flame retardant composition of the flame retardant layer comprises a metal hydroxide, a metal oxide, a metal borate, a metal carbonate, an expandable graphite, or a combination thereof, and
   wherein the dual layer material has
      a thickness of 3.5 millimeters or less, and
      a UL-94 rating of V1, HF1, or a combination thereof.

2. The dual layer material of claim 1, wherein the compressible polymer foam layer has
   a density of 80 to 400 kg/m$^3$; and
   compression force deflection of 5 to 500 kPa, at 25% deflection determined in accordance with ASTM D3574-17.

3. The dual layer material of claim 1, wherein the compressible polymer foam layer has a thickness of 0.1 to less than 3.5 millimeters.

4. The dual layer material of claim 1, wherein the compressible polymer foam layer further has
   a compression force deflection of 100 to 500 kPa at 75% deflection determined in accordance with ASTM D3574-17;
   a compression set of 0 to 15%, at 50% deflection determined in accordance with ASTM D3574-95, Test D at 23° C. or 70° C.; or
   a combination thereof.

5. The dual layer material of claim 1, wherein the compressible polymer foam comprises a polyacetal, a poly($C_{1-6}$ alkyl) acrylate, a polyacrylic, a polyamide, a polyamideimide, a polyanhydride, a polyarylate, a polyarylene ether, a polyarylene sulfide, a polybenzoxazole, a polycarbonate, a polyester, a polyetheretherketone, a polyetherimide, a polyetherketoneketone, a polyetherketone, a polyethersulfone, a polyisocyanurate, a polyimide, a poly($C_{1-6}$ alkyl) methacrylate, a poly((meth)acrylic acid), a polyphthalide, a polyolefin, a polysilazane, a polystyrene, a polysulfide, a polysulfonamide, a polysulfonate, a polythioester, a polytriazine, a polyurea, a polyvinyl alcohol, a polyvinyl ester, a polyvinyl ether, a polyvinyl halide, a polyvinyl ketone, a polyvinylidene fluoride, a polyvinyl ester, a crosslinked poly(ester), an epoxy, a melamine, phenolic polymer, a polyurethane, a urea-formaldehyde, a silicone, a natural rubber, polychloroprene, an ethylene-propylene-diene monomer (EPDM) rubber, or a combination thereof.

6. The dual layer material of claim 1, wherein the compressible polymer foam comprises a polyurethane foam.

7. The dual layer material of claim 1, wherein the flame retardant layer has a density of 240 to 1,000 kg/m$^3$.

8. The dual layer material of claim 1, wherein the flame retardant composition of the flame retardant layer comprises an expandable graphite.

9. The dual layer material of claim 1, wherein the flame retardant composition of each of the compressible polymer foam layer and the flame retardant layer independently does not comprise a halogenated flame retardant or an antimony compound.

10. The dual layer material of claim 1, having
    a compression force deflection of 5 to 1,035 kPa at 25% deflection determined in accordance with ASTM D3574-17;
    a compression force deflection of 100 to 500 kPa at 75% deflection;
    a compression set of 0 to 15% at 50% deflection determined in accordance with ASTM D3574-95, Test D at 23° C. or 70° C.; or
    a combination thereof.

11. The dual layer material of claim 10, wherein the compressible polymer foam layer comprises polyurethane.

12. A method of preparing the dual layer material of claim 1, the method comprising
    forming the compressible polymer foam layer and the flame retardant layer; and
    contacting the compressible polymer foam layer and the flame retardant layer under conditions effective to adhere the layers to form the dual layer material.

13. A method of preparing the dual layer material of claim 1, the method comprising
    forming one of the compressible polymer foam layer and the flame retardant layer; and
    forming the other of the compressible polymer foam layer and the flame retardant layer onto a surface of the formed layer to provide the dual layer material.

14. The method of claim 13, comprising
    forming the compressible polymer foam layer; then
    forming the flame retardant layer on the first side of the compressible polymer foam layer.

15. An electronic device comprising the dual layer material of claim 1.

16. A dual layer material, comprising
a compressible polymer foam layer, wherein the compressible polymer foam layer has
a density of less than 400 kg/m$^3$,
a compression force deflection of 5 to 1,035 kPa at 25% deflection determined in accordance with ASTM D3574-17, and
a thickness of less than 3.5 millimeters; and
a solid, polymeric flame retardant layer comprising polyethylene terephthalate disposed on a first side of the compressible polymer foam layer, wherein the flame retardant layer has
a thickness of less than 0.3 millimeters, wherein the thickness of the compressible polymer foam layer is at least two times greater than the thickness of the flame retardant layer;
wherein each of the compressible polymer foam layer and the flame retardant layer comprises a flame retardant composition, and
wherein the dual layer material has
a thickness of 3.5 millimeters or less, and
a UL-94 rating of V1, HF1, or a combination thereof.

17. The dual layer material of claim 16, wherein the flame retardant composition of the flame retardant layer comprises a metal hydroxide, a metal oxide, a metal borate, a metal carbonate, an expandable graphite, or a combination thereof.

18. The dual layer material of claim 16, wherein the flame retardant composition of the flame retardant layer comprises an expandable graphite.

* * * * *